US007111234B2

United States Patent
Peck et al.

(10) Patent No.: US 7,111,234 B2
(45) Date of Patent: Sep. 19, 2006

(54) SYSTEM AND METHOD FOR IN-LINE EDITING OF WEB-BASED DOCUMENTS

(75) Inventors: David K. Peck, San Francisco, CA (US); Eliot S. Greenfield, San Francisco, CA (US); Jesse G. Kocher, San Francisco, CA (US); Matthew R. Lerner, San Francisco, CA (US); Michael S. Morearty, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 09/847,606

(22) Filed: May 2, 2001

(65) Prior Publication Data

US 2002/0188636 A1 Dec. 12, 2002

(51) Int. Cl.
G06F 15/00 (2006.01)
(52) U.S. Cl. .............. 715/517; 715/513; 715/522; 715/530
(58) Field of Classification Search ............ 715/513, 715/500.1, 501.1, 522, 517; 709/201, 217, 709/218, 225; 345/660; 707/9, 10, 102; 705/10
See application file for complete search history.

(56) References Cited

U.S. PATENT DOCUMENTS

| 6,101,509 | A * | 8/2000 | Hanson et al. ............ 715/513 |
| 6,700,589 | B1 * | 3/2004 | Canelones et al. ......... 345/660 |
| 2001/0054049 | A1 * | 12/2001 | Maeda et al. ............. 707/517 |
| 2002/0004813 | A1 * | 1/2002 | Agrawal et al. ........... 709/201 |

OTHER PUBLICATIONS

Eric Ladd et al. (hereinafter Ladd) "Complete Edition Using HTML 4, XML, and JAVA 1.2" (Public Release Dec. 23, 1998, pp. 262-280, 499-506, 582-668 and 658-659.*
Matthews et al. Complete Reference FrontPage 2000 Pulic Release 1999 by Osborn/MacGraw-Hill, pp. 856-858.*
Matthews et al. Complete Reference FrontPage 2000 Pulic Release 1999 by Osborn/MacGraw-Hill, pp. 499-500, 466-469, 468, 404-411, 412-416.*
Wilcox, Lynn D. et al. "Dynomite: A Dynamically Organized Ink and Audio Notebook". CHI 97, Mar. 22-27, 1997, pp. 186-193.
Price, Morgan N. et al. "XLibris: The Active Reading Machine". CHI 98, Apr. 18-23, 1998. pp. 22-23.
Schilit, Bill N. et al. "Beyond Paper: Supporting Active Reading with Free Form Digital Ink Annotations". CHI 98, Apr. 18-23, 1998. pp. 249-256.

(Continued)

Primary Examiner—William Bashore
Assistant Examiner—Quoc A. Tran
(74) Attorney, Agent, or Firm—Banner & Witcoff, Ltd.

(57) ABSTRACT

A method for editing Web-based documents and a software package for implementing the method is provided. The method can include receiving from a user an indication of a selected portion of a Web-based document to be edited and of a desired editing function to be performed on the selected portion and inserting immediately prior to the selected portion a first editing tag corresponding to the desired editing function. Also, the method may include detecting object tag elements within the selected portion, inserting immediately prior to each object tag element within the selected portion a second editing tag corresponding to the desired editing function and inserting the second tag at the end of the selected portion, and inserting immediately after each object tag element within the selected portion the first editing tag, wherein the first and second editing tags are distinguishable from the object tag elements.

26 Claims, 9 Drawing Sheets

OTHER PUBLICATIONS

Schilit, Bill N. et al. "Digital Library Information Appliances" Digital Library 98; Pittsburgh, PA. pp. 217-226.

Moran, Thomas P. et al., "Spatial Interpretation of Domain Objects Integrated into a Freeform Electronic Whiteboard", UIST '98, San Francisco, CA. pp. 175-184.

Kurtenbach, Gordon et al. "Issues in Combining Marking and Direct Manipulation Techniques", UIST '91, Nov. 11-13, 1991. pp. 137-144.

Long Jr., A. Chris, "Dissertation Proposal: The Design and Evaluation of Gestures for Pen-based User Interfaces". Qualifying Exam Proposal References, pp. 1-8.

Ross, Mark D. et al., "Ambiguous Intentions: a Paper-like Interface for Creative Design", UIST '96, Seattle Washington. pp. 183-192.

Moran, Thomas, P. et al., "Pen-Based Interaction Techniques for Organizing Material on an Electronic Whiteboard". UIST '97, Banff, Alberta, Canada. pp. 45-54.

Forsberg, Andrew et al., "The Music Notepad". Brown University, Providence RI, 7 pages.

Lerner, Matt A Survey of Pen-Based User Interfaces: When Will They Be as Good as Pencil and Paper? Brown University, Providence RI, 713 pages.

Davis, Richard C. et al. "A Framework for Sharing Handwritten Notes". UIST '98, San Francisco, CA. pp. 119-120.

Landay, James A. et al., "Sketching Storyboards to Illustrate Interface Behaviors"., HCI Institute, Carnegie Mellon University, 2 pages.

Landy, James A. et al. "Interactive Sketching for the Early Stages of User Interface Design", Carnegie Mellon University, 8 pages.

Long Jr., Allan Christian "Improving Gestures and Interaction Techniques for Pen-Based User Interfaces". CHI '98, Apr. 18-23, 1998. pp. 58-59.

Rubine, Dean. "Combing Gestures and Direct Manipulation" CHI '92, May 3-7, 1992. pp. 659-660.

Kurtenbach, Gordon et al. "Contextual Animation of Gestural Commands". Xerox Palo Alto Research Center, Palo Alto, CA, University of Toronto, 14 pages.

Tapia, Mark A. et al., "Some Design Refinements and Principles on the Appearance and Behavior of Marking Menus". UIST '95 Nov. 14-17, 1995. pp. 189-195.

Moran, Thomas P. et al., "Implicit Structures for Pen-Based Systems Within a Freeform Interaction Paradigm". Xerox Palo Alto Research Center, Palo Alto, CA, 11 pages.

Bier, Eric A. et al., "Toolglass and Magic Lenses: The See-Through Interface" Xerox Palo Alto Research Center, Palo Alto, CA, University of Toronto, University of Washington, 8 pages.

* cited by examiner

Fig. 3a

With malice toward none; with charity for all; with firmness in the right, as God gives us to see the right, let us strive on to <u>finish the work we are in; to bind up the nation's wounds,</u> to care for him who shall have borne the battle, and for his widow and his orphan—to do all which may achieve and cherish a just and lasting peace among ourselves and with all nations.

Fig. 3b

With <object tag bold on>malice toward none; <in-line 1 on>with charity for all; with firmness in the right<in-line 1 off><object tag bold off><in-line 1 on>, as God gives us to see the right<in-line 1 off>, let us strive on to finish the work we are in; <in-line 2 on> to bind up the nation's wounds, <in-line 2 off><object tag bold><in-line 2 on> to care for him who shall have borne the battle<in-line 2 off>, and for his widow and his orphan—to do all which may achieve and cherish a just and lasting peace among ourselves and with all nations.

Fig. 3c

With malice toward none; *with charity for all; with firmness in the right,* as God gives us to see the right, let us strive on to <u>finish the work we are in;</u> <u>to bind up the nation's wounds, to care for him who shall have borne the battle,</u> and for his widow and his orphan—to do all which may achieve and cherish a just and lasting peace among ourselves and with all nations.

Fig. 4

...A...
<inline bold start with single selection start flag and order 1>
...selected portion...
</inline bold end with single selection end flag and order 1>
...B...

Fig. 5a

...A...
<inline bold start with single selection start flag and order 1>
...B...
<span tag with non-bold CSS attribute>
...C...
</span>
...D...
</inline bold end with single selection end flag and order 1>
...E...

Fig. 5b

...A...
<inline bold start with single selection start flag and order 1>
...B...
</inline bold end>
<span tag with non-bold CSS attribute>
<inline bold start>
...C...
</inline bold end>
</span>
<inline bold start>
...D...
</inline bold end with single selection end flag and order 1>
...E...

Fig. 6a

```
. . .A. . .
<inline bold start with single selection start flag and order 1>
. . .B. . .
</italic close - unmatched>
. . .C. . .
</inline bold end with single selection end flag and order 1>
. . .D. . .
```

Fig. 6b

```
. . .A. . .
</italic close with inline flag>
<inline bold start with single selection start flag and order 1>
<italic open with inline flag>
. . .B. . .
</italic close>
. . .C. . .
</inline bold end with single selection end flag and order 1>
. . .D. . .
```

Fig. 7a

```
. . .A. . .
<inline bold start with single selection start flag and order 1>
. . .B. . .
</italic close - unmatched>
. . .C. . .
</color blue close - unmatched>
. . .D. . .
</inline bold end with single selection end flag and order 1>
. . .E. . .
```

Fig. 7b

```
. . .A. . .
</italic close with inline flag>
</color blue close with inline flag>
<inline bold start with single selection start flag and order 1>
<color blue open with inline flag>
<italic open with inline flag>
. . .B. . .
</italic close - now matched>
. . .C. . .
</color blue close - now matched>
. . .D. . .
</inline bold end with single selection end flag and order 1>
. . .E. . .
```

Fig. 8a

```
...A...
<inline bold start with single selection start flag and order 1>
...B...
<span tag open with non-bold CSS attribute>
...C...
</italic close - unmatched>
...D...
</span tag close>
...E...
</inline bold end with single selection end flag and order 1>
...F...
```

Fig. 8b

```
...A...
</italic close with inline flag>
<inline bold start with single selection start flag and order 1>
<italic open with inline flag>
...B...
</italic close with inline flag>
</inline bold end>
<span tag open with non-bold CSS attribute>
<inline bold start>
<italic open with inline flag>
...C...
</italic close - now matched>
...D...
</inline bold end>
</span tag close>
<inline bold start>
...E...
</inline bold end with single selection end flag and order 1>
...F...
```

Fig. 9a

...A...
<inline bold start with single selection start flag and order 1>
...B...
<italic open - unmatched>
...C...
</inline bold end with single selection end flag and order 1>
...D...

Fig. 9b

...A...
<inline bold start with single selection start flag and order 1>
...B...
<italic open - now matched >
...C...
</italic close with inline flag>
</inline bold end with single selection end flag and order 1>
<italic open with inline flag>
...D...

Fig. 10a

...A...
<inline bold start with single seletion start flag and order 1>
...B...
<italic open - unmatched>
...C...
</color blue close - unmatched>
...D...
</inline bold end with single selection end flag and order 1>
...E...

Fig. 10b

...A...
</color blue close with inline flag>
<inline bold start with single selection start flag and order 1>
<color blue open with inline flag>
...B...
</color blue close with inline flag>
<italic open – now matched>
<color blue open with inline flag>
...C...
</color blue close – now matched>
...D...
</italic close with inline flag>
</inline bold end with single selection end flag and order 1>
<italic open with inline flag>
...E...

SYSTEM AND METHOD FOR IN-LINE EDITING OF WEB-BASED DOCUMENTS

FIELD OF THE INVENTION

The present invention relates to systems and methods for editing Web-based documents.

BACKGROUND INFORMATION

Web-based documents are most often created in hyper text mark-up language (HTML). They are typically stored on a server computer so that they can be accessed on a read-only basis by web browsers on remote computers via, for example, the Internet. Presently, in order to edit these documents, they must be taken off-line (e.g., removed from a usef user's browser) and imported into a text or HTML editor. This makes editing of HTML documents by remote users cumbersome.

SUMMARY OF THE INVENTION

The present invention is directed to a method for editing a Web-based document, comprising the steps of:
 a) receiving from a user an indication of a selected portion of the Web-based document to be edited;
 b) receiving from the user a desired editing function to be performed on the selected portion;
 c) inserting immediately before the selected portion a first editing tag corresponding to the desired editing function;
 d) detecting object tag elements within the selected portion;
 e) inserting immediately prior to each object tag element within the selected portion a second editing tag corresponding to the desired editing function; and
 f) inserting the second editing tag at the end of the selected portion, wherein the first and second editing tags are distinguishable from the object code elements.

The present invention is also directed to a software package for editing a Web-based document, comprising:
 a) an interface module for interfacing with a browser software;
 b) a receiving module for receiving from a user an indication of a selected portion of a Web-based document currently displayed by the browser software and of a desired editing function to be performed on the selected portion;
 c) an object tag detecting module detecting predetermined object tag elements within the selected portion;
 d) an insertion module inserting immediately prior to and after each predetermined object tag element within the selected portion one of a plurality of in-line tags corresponding to the desired editing function, the insertion module inserting a first in-line tag immediately prior to the selected portion and inserting a second in-line tag immediately after the selected portion; and
 e) a distinguishing module for distinguishing between the in-line tags and object tag elements.

BRIEF DESCRIPTION OF THE DRAWINGS

FIG. 3a shows the original text and appearance of an example WBD;

FIG. 3b shows a corresponding portion of the WBD of FIG. 3a in a "reveal tags" format showing all of the original object tags as well as in-line editing tags added by a user;

FIG. 3c shows the edited WBD of FIG. 3b in a "final" view with the original object tags and in-line editing tags taking effect;

FIG. 4 shows code and text of a document edited in accord with a first example of the logic of the in-line editing software according to the present invention;

FIG. 5a shows text and code in a portion of an example Web-based document prior to application of a second example of the logic of the in-line editing software according to the present invention;

FIG. 5b shows the code and text of the portion of the example Web-based document of FIG. 5a edited in accord with the second example of the logic of the in-line editing software according to the present invention;

FIG. 6a shows text and code in a portion of an example Web-based document prior to application of a third example of the logic of the in-line editing software according to the present invention;

FIG. 6b shows the code and text of the portion of the example Web-based document of FIG. 6a edited in accord with the third example of the logic of the in-line editing software according to the present invention;

FIG. 7a shows text and code in a portion of an example Web-based document prior to application of a fourth example of the logic of the in-line editing software according to the present invention;

FIG. 7b shows the code and text of the portion of the example Web-based document of FIG. 7a edited in accord with the fourth example of the logic of the in-line editing software according to the present invention;

FIG. 8a shows text and code in a portion of an example Web-based document prior to application of a fifth example of the logic of the in-line editing software according to the present invention;

FIG. 8b shows the code and text of the portion of the example Web-based document of FIG. 8a edited in accord with the fifth example of the logic of the in-line editing software according to the present invention;

FIG. 9a shows text and code in a portion of an example Web-based document prior to application of a sixth example of the logic of the in-line editing software according to the present invention;

FIG. 9b shows the code and text of the portion of the example Web-based document of FIG. 9a edited in accord with the sixth example of the logic of the in-line editing software according to the present invention;

FIG. 10a shows text and code in a portion of an example Web-based document prior to application of a seventh example of the logic of the in-line editing software according to the present invention; and FIG. 10b shows the code and text of the portion of the example Web-based document of FIG. 10a edited in accord with the seventh example of the logic of the in-line editing software according to the present invention.

DETAILED DESCRIPTION

The present invention allows computer users to edit Web-based documents (WBDs) from directly within a Web browser ("in-line"). Users may easily alter and/or annotate preexisting WBDs hosted on remote servers and efficiently share these edits with other remote users. This in-line editing supports sophisticated features such as the ability to rewrite, rearrange, strike-out, boldface, italicize, underline and otherwise alter content directly within Web browser. The in-line editing functionality includes the ability to store and recall edits. This, along with the fact that edited WBDs are themselves standard WBDs, implies that in-line editing functionality integrates without modification with software described, for example in U.S. patent application Ser. No. 09/521,022, filed Mar. 7, 2000 (the '022 application).The '022 application is hereby expressly incorporated herein by reference in its entirety including the specification, claims and drawings thereof. Thus, users may send edited WBDs to other users who may view the edited WBD whether or not they are equipped with this in-line editing software.

Figure 1:
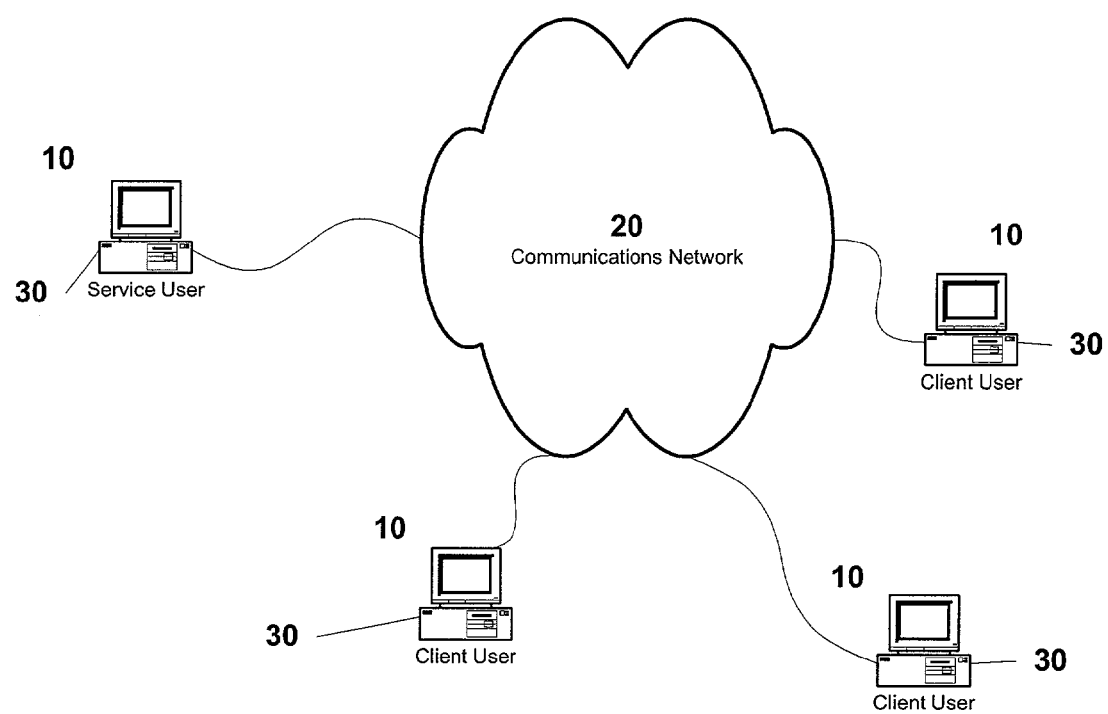
FIG. 1 shows an exemplary communications network and associated hardware on which a system according to the present invention may be run.

FIG. 1 shows an exemplary system on which the present invention may be utilized. Specifically, each of a plurality of users 10 is coupled to a communications network 20 (e.g., the Internet). As indicated in FIG. 1, the users 10 which are, therefore, coupled to one another via the communications network 20, may include, for example, a service user (e.g., a web designer) and a plurality of client users. Of course, those skilled in the art will understand that the communications network 20 may be any arrangement which allows computers to communicate with one another such as a local area network, a wide area network or an intranet. Each of the users 10 may employ a device 30 which may be, for example, a personal computer, handheld personal digital assistant ("PDA"), or any other type of microprocessor-based device capable of reading web-based documents and including input means (e.g., a keyboard).

Figure 2:
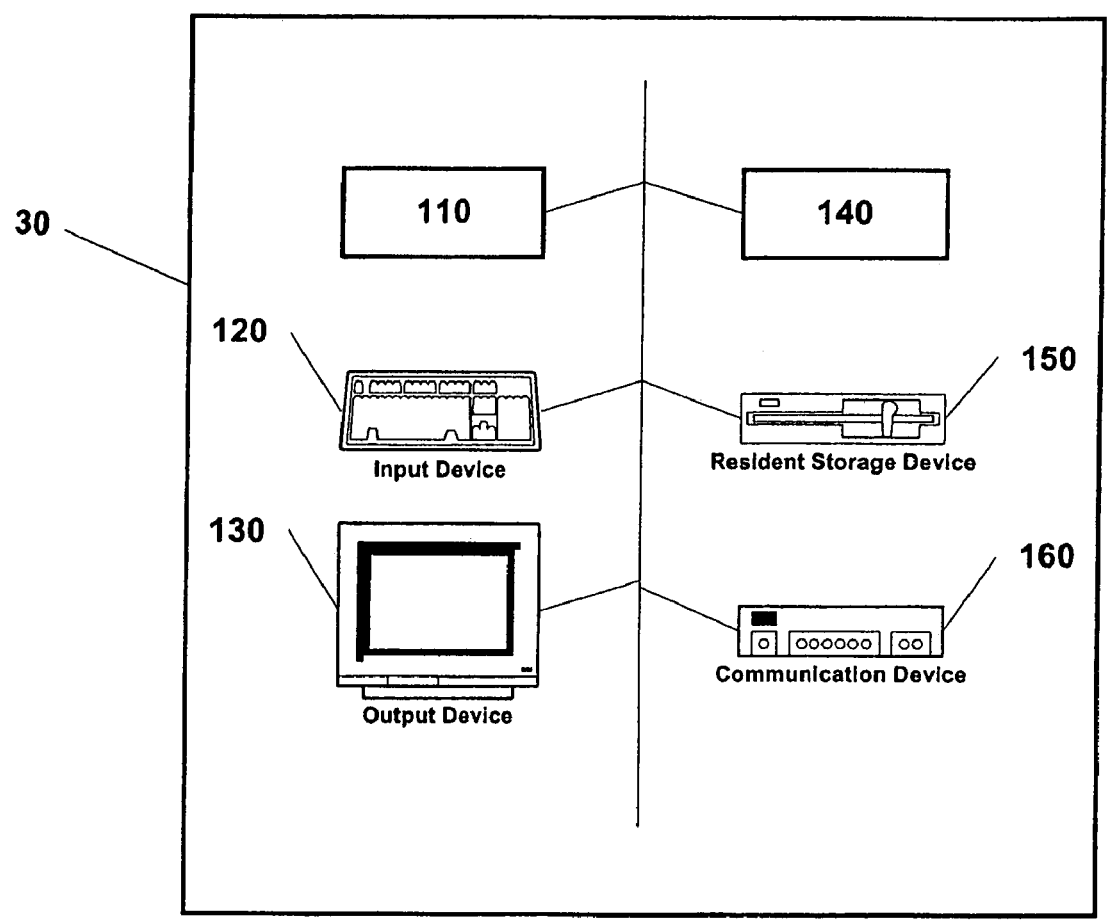
FIG. 2 is a block diagram illustrating the components of an exemplary device which may be used in conjunction with the system of FIG. 1.

FIG. 2 shows an example of such a device 30 which maybe employed by the users 10. The device 30 may include a processor 110, input device 120, output device 130, temporary storage device 140, resident storage device 150, and communication device 160. Input device 120 may include, for example, a keyboard, mouse, pen-operated touch screen, voice-recognition device, and/or any other device that provides input from a user 10. Output device 130 may include a monitor, printer, disk drive, speakers, or any other device that provides tangible output to user 10. Temporary storage device 140 may include RAM, caches, and any other volatile storage media that temporarily hold data while processing it. Resident storage device 150 may include a hard drive, CD-ROM drive, tape drive, removable storage disk, or any other nonvolatile data storage medium.

As will be understood by those of skill in the art, the in-line editing software according to the present invention and software for a Web browser may reside in resident storage device 150. In-line editing software may include, among others, a Web browser plug-in, an independent software program or a feature of an operating system. Web browser may include, among others, Microsoft's Internet Explorer™ or Netscape Navigator™. Communication device 160 may include a modem, network interface card, or any other device able to transmit and receive signals over a network. One skilled in the art will appreciate that the components of device 30 may also be connected wirelessly, for example, through an infrared connection.

A network architecture that facilitates the storing, searching and transfer of edited WBDs in accordance with an exemplary embodiment of the present invention may be constructed as more fully described in the '022 application. According to one embodiment, after a first user 10 (e.g., the service user) has produced a draft version of a WBD and transferred the draft WBD to an annotation server 4, the first user 10 may inform a second user 10 of the location (e.g., the URL) at which the draft WBD is stored. The second user 10 may then open his Web browser and accesses the draft WBD via the browser and edit the draft WBD through Web browser and in-line editing software and transmit the edited WBD via communications network 20 to an editing repository located in, for example, a central server.

FIGS. 3a–3c depict an edited WBD in accordance with an exemplary embodiment of the present invention. In-line editing software enables a user 10 to make any desired changes to a WBD including, for example, adding, deleting or modifying text or graphics and altering the appearance of the text or graphics (e.g., changing a font, underlining or bolding text or changing a color composition of graphics). Changes made by the in-line editing software are distinguishable by the in-line editing software from the original code of the WBD (e.g., HTML code). Thus, the in-line editing software may produce a redline version highlighting the changes made to the original WBD or may easily revert to the original version of the WBD.

In-line Editing Basics

According to one embodiment, editing software may display an editing toolbar as is known in the art (e.g., along a bottom edge of the Web browser) which may allow, for example, a user 10 to select any of a plurality of editing tools, to print or save the edited WBD and to send an editing link or an EDIT file (described in detail below) by e-mail. The editing tools provided may for example be similar to those available on the toolbars of commercially available word processing programs such as WordPerfect™ or MicroSoft Word™. The toolbar may also allow users 10 to access their accounts in an editing repository, located in, for example, the central server, and change their user preferences, etc.

In-line Tag Management Algorithms

The in-line editing software includes a plurality of algorithms for modifying the display properties of WBDs while maintaining the WBD syntactically valid. After significant processing, all actions requested by a user 10 of the in-line editing software cause the rearrangement, insertion, or deletion of a carefully chosen set of in-line editing tags within the WBD's document object model.

If, for example, a user 10 wishes to bold a portion of text in a WBD, the user 10 may perform this operation in a manner similar to that employed in the word processing softwares mentioned above by using the mouse or keyboard to select the portion of text to be bolded and then selecting the "Bold" feature from the either the toolbar or alternatively from a pull down menu. The in-line editing software performs this function by reading the code (i.e., the object tags) of the original WBD stored in a temporary file of the internet browser along with other data relating to the file stored by the browser and inserting one or more in-line editing tags immediately before the beginning of the selected portion of text. A first one of the in-line editing tags which is always inserted immediately prior to the selected portion of text corresponds to the desired function. The in-line editing software then reads through the selected portion of text scanning for object tags (e.g., HTML commands). If the first object tag encountered by the in-line editing software is a close tag (i.e., a tag ending a previous text attribute), the in-line editing software determines that this text attribute has begun prior to the selected portion of text and carries into the selected portion of text (a "carried-in" text attribute). In this case, the in-line editing software inserts immediately prior to the selected portion of text, in addition to the in-line editing tag corresponding to the desired function, two additional codes: 1) an in-line editing close code canceling the carried-in text attribute; and 2) an in-line editing open code restarting the carried-in text attribute.

As will be understood by those of skill in the art, the in-line editing tags may be, for example, normal HTML tags to which a custom attribute has been added to allow the in-line editing software to identify them. The in-line editing software may identify these tags by instructing the browser to provide a list of all HTML tags including this custom attribute set. Thus as would be apparent to those of skill in the art, an in-line editing tag identifying module of the in-line editing software may comprise the relatively limited amount of code necessary to make this request of the browser. As each of the in-line editing tags is distinguishable from the tags of the underlying WBD, the function corresponding to a particular in-line editing tag may be defined as desired by a user 10 for a particular document and the user 10 may alter the definitions of any of these in-line editing tags after changes have been made.

After the in-line editing software has performed steps 1) and 2) above, the selected portion of text is read through until the in-line editing software encounters the next object tag. Immediately prior to this object tag, the in-line editing software inserts an in-line editing tag ending the function desired by the user 10. The in-line editing software then inserts an in-line editing tag to re-start this desired function immediately after each encountered tag. When the end of the selected portion of text is reached, the in-line editing program inserts an in-line editing tag ending the desired function.

Adding Text to a WBD

If a user 10 wishes to add text to a WBD, as the user 10 begins typing into the WBD (or when the user 10 pastes text cut from another document or another area of the WBD), the in-line editing software inserts into the WBD immediately prior to the added text, an in-line editing open tag indicating that text is to be added. At the end of the added text, the in-line editing software adds an in-line editing close tag indicating that the added text has ended. Similarly, if a user 10 wishes to delete text from a WBD, the in-line editing software inserts immediately prior to the text to be deleted, an in-line editing open tag for a hide text function. The in-line editing software then reads through the text to be deleted and, when an object tag is encountered within this text, the in-line editing software inserts an in-line editing close tag for the hide text function before the encountered object tag and then inserts an in-line editing open tag for the hide text function immediately following this object tag. When the user 10 has deleted all of the contiguous text which he wishes to delete (determined, e.g., by detecting a keystroke, mouse click, etc., in an area not contiguous with the deleted text), the in-line editing software inserts an in-line editing close tag corresponding to the hide text function at the end of the text to be deleted.

Data necessary to recreate the WBD including all of the edits made by a user 10 may be saved in an EDIT file. Of course, the EDIT file may include the complete code of the WBD including all of the new code added by the user 10 through the use of the in-line editing software. However, in order to reduce the amount of data which must be saved in each EDIT file, the data may be limited to each portion of the edited WBD including in-line editing tags as well as selected context portions of the WBD immediately prior to and after each such portion including the in-line editing codes. These context portions allow the in-line editing software to recreate the edited WBD by assembling the EDIT file with the original WBD which may be retrieved by the same user 10 or a second remote user 10. Furthermore, the EDIT file may include at a beginning thereof a header including the current definitions of the various in-line editing tags which may, for example, be identified as simply in-line editing tag 1, in-line editing tag 2, in-line editing tag 3, etc. Each of the various in-line editing tags may have a default function which may then be altered by a user 10 by amending the header to change the operation of these tags throughout the edited text.

Furthermore, the in-line editing software may include several stock headers which may be selected by the user 10 to achieve desired views of the edited WBD. For example, if the user 10 selects a redline view showing the changes made to the WBD, the in-line editing software may automatically redefine the in-line editing tags which were previously defined as open and close "insert text" to function as open and close tags which color the inserted text blue and underline the inserted text. Similarly, the in-line editing tags which had been defined as open and close "hide text" tags may be redefined to function as open and close tags which function to color the text red and strike a line through the red text.

If the user 10 selects an original view showing the WBD as it appeared before any editing, the in-line editing software may automatically redefine the in-line editing tags which, for example, were previously defined as open and close "insert text" to function as open and close tags for "hide text" while redefining the tags which had previously been defined as "hide text" to "insert text" tags.

Thus, the in-line editing software allows a user 10 to select any of several views of an edited WBD including, for example, the original unedited version of the WBD, a redline version showing the edits and a preview version showing the edited WBD as it would appear in finished form.

As mentioned above, when a user 10 saves an edited WBD, the in-line editing software may save system resources by saving to an EDIT file only those portions of the edited WBD necessary to reassemble the entire edited WBD. That is, portions of the WBD which have not been changed are not saved. Only those portions of the WBD which have been edited are saved along with selected portions of text and tag preceding and following the edited portions. These selected portions of preceding and following text and tag are attached in the EDIT file to the edited portions to which they correspond. Then, when the in-line editing software is instructed to reassemble the edited WBD, the original WBD is retrieved and searched for the selected portions of text and tag saved in the corresponding EDIT file. When these selected portions of text and tag have been identified, the edited text and tags are inserted in the proper position and the edited WBD is reassembled.

FIGS. 3a, 3b and 3c show an exemplary edited WBD, edited using the in-line editing software according to the present invention. In-line editing software enables a user 10 to make any desired changes to a WBD including, for example, adding, deleting or modifying text or graphics and altering the appearance of the text or graphics (e.g., changing a font, underlining or bolding text or changing an opacity of a graphic). Changes made through the use of the in-line editing software are distinguishable by the in-line editing software from the original code of the WBD (e.g., HTML code). Thus, the in-line editing software may produce a redline version of the WBD or may revert to the original version of the WBD. For example, FIG. 3a shows an example of an original text and appearance of a WBD while FIG. 3b shows a corresponding portion of the WBD of FIG. 3a in a "reveal tags" format showing all of the original object tags as well as the in-line editing tags added by the in-line editing software in response to indications from the user 10 as to the desired changes to the WBD. Finally, FIG. 3*c* shows the edited WBD as it would appear in a "final" view with the original object tags and in-line editing tags taking effect.

The present in-line editing software comprises a set of algorithms for modifying the display properties of a WBD while keeping the WBD syntactically valid. After significant processing, all actions requested by the user 10 of the in-line editing software cause the rearrangement, insertion, or deletion of a carefully chosen set of in-line editing tags into the WBD's document object model.

Each in-line editing tag takes advantage of style sheet attributes (such as Cascading Style Sheet, or CSS attributes) in order to achieve its desired effect as would be understood by those of skill in the art. Due to the flexible nature of style sheet attributes, the actual function corresponding to a particular in-line editing tag may be redefined as desired by a user 10 for a particular situation. As mentioned above, all actions requested by the user 10 of the in-line editing software cause the rearrangement, insertion, or deletion of a carefully chosen set of in-line editing tags into the WBD's document object model.

The in-line editing software performs this function by following a series of steps. First the in-line editing software gains access to the document model of the original WBD, which is present in the Internet browser. Next, the in-line editing software scans through the document object hierarchy of the WBD and inserts in-line editing tags corresponding to user-specified editing actions into the WBD as described above. These in-line editing tags serve three purposes:

1. they cause the browser to display the selected portion of the WBD with the desired visual editing effect;
2. they mark the extent of a selected region by using simple flags (e.g., custom HTML attributes); and
3. they identify the order in which in-line tags were added to the document (also using custom attributes).

That is, each of the in-line editing tags contains at least one custom attribute (i.e., identifying the tag as an in-line editing tag) and may include one or more additional custom attributes such as, for example, an order or extent related custom attribute. The "order" and "extent" attributes of in-line editing tags allows the in-line editing software to permit multiple undo/redo actions on the document, even after the document has been sent to a new user 10. FIG. 4 shows an example of such codes in place around a selected portion of a WBD where ". . ." represents valid WBD code. The same convention will apply throughout FIGS. 4–10.

Under certain circumstances, these "before and after" tags may not be sufficient to ensure that the desired visual editing effect is maintained throughout the selected portion of the document. There are two situations in which simply adding these two tags is not sufficient.

Case 1) The first such situation, illustrated in FIG. 5*a* and 5*b*, is when a portion of the WBD selected for in-line editing contains "closing" or "opening" object tags that could effectively negate the behavior of the original two in-line editing tags. This is most likely to arise with complex WBDs utilizing Cascading Style Sheets (CSS) or other external style document object model languages to describe how they should be visually displayed. To prevent this, the in-line editing software scans the portion of the WBD to be edited for predetermined "negating" tags (e.g., CSS properties that specify that a font weight should be regular rather than bold: style='font-weight:regular'). If such "negating" tags are found, the in-line editing software surrounds the "negating" tags with additional copies of the necessary in-line close and open tags to ensure that the in-line tags take the desired effect and the selection start and end flags are only set on the very first and last in-line tags. The in-line editing software then ensures that the strict in-line editing tag embedding hierarchy is maintained. FIG. 5*a* shows the state of the code immediately prior to the application of the logic of Case 1, while FIG. 5*b* shows the resulting state of the object and in-line editing tags after application of the logic of Case 1.

Case 2) Furthermore, if the in-line editing software were to simply insert in-line editing tags before and after the selected portion, the original WBD's strict tag nesting hierarchy might be broken causing the browser to display the WBD incorrectly. As will be understood by those of skill in the art, less forgiving web browsers strictly enforce the hierarchical nature of object tags (i.e., they enforce the principles of HTML tag nesting). This may occur, for example, if:

(a) the portion of the WBD to be edited contains one or more close object tags corresponding to open object tags located before the start of the portion to be edited;
(b) the portion to be edited contains one or more open object tags corresponding to close object tags located after the end of the portion to be edited, or
(c) the portion to be edited contains spurious or invalid object tags that do not correspond to other object tags in the WBD.

To detect and contend with Case 2*a* as illustrated with examples in FIGS. 6*a*, 6*b*, 7*a*, 7*b*, 8*a* and 8*b*, the in-line editing software scans forward through the selected portion to be edited, remembering the object tags that it has encountered. If an unmatched "close" object tag is found, the in-line editing software assumes that this "close" object tag corresponds to an "open" object tag located before the selected portion of the WBD. That "close" object tag is then closed before the first in-line editing tag, and re-opened immediately thereafter. This object code is then closed and reopened at each encountered object tag within the selected portion of the WBD until the point at which the unmatched "close" object tag is encountered. The special initial in-line editing "closing" tag is marked with a custom flag to let the in-line editing software know that it was placed specifically for in-line editing purposes. Each of FIGS. 6*a*, 7*a* and 8*a* shows the state of the code immediately prior to the application of the logic of Case 2*a*, while each of FIGS. 6*b*, 7*b* and 8*b* shows the resulting state of the object and in-line editing tags after application of the logic of Case 2*a*.

To detect and contend with Case 2*b*, the in-line editing software scans forward through the selected portion of the WBD, remembering the object tags that it has encountered. If an "open" object tag is found to have no associated "close" object tag within the selected portion, the in-line editing software assumes that this "open" object tag corresponds to a "close" object tag located after the selected portion of the WBD. This "open" object tag is then opened after the last in-line editing tag at the end of the selected portion, and is also re-opened within each in-line editing tag block after the point at which the unmatched "open" object tag is found. The special final opening in-line editing tag is marked with a custom flag to let the in-line editing software know that it was placed specifically for in-line editing purposes. FIG. 9*a* shows the state of the code immediately prior to the application of the logic of Case 2*b*, while FIG. 9*b* shows the resulting state of the object and in-line editing tags after application of the logic of Case 2*b*.

For Case 2c, as illustrated in FIGS. 10a and 10b, where one or more object tags within a selected portion of a WBD do not correspond to any other object tags in the WBD, is implicitly handled by the behavior of the in-line editing software in cases 2a and 2b. Spurious "close" and "open" object tags will be handled in the manner of cases 2a and 2b, respectively as if these object tags do match others in the WBD. The logic behind this behavior is this: web browsers capable of gracefully handling spurious tags will have no problems displaying the newly modified WBD. However web browsers incapable of gracefully handling spurious tags will not have been able to display the original WBD in the first place. FIG. 10a shows the state of the code immediately prior to the application of the logic of Cases 2a and 2b, while FIG. 10b shows the resulting state of the object and in-line editing tags after application of the logic of Cases 2a and 2b.

It is important to note that none of these cases is mutually exclusive. The in-line editing software may have to solve of one, two, or all three of the cases in a single WBD. Due to the behavior of these cases, they can be addressed one-by-one to achieve a WBD containing validly nested object and in-line editing tags.

A user 10 of the present in-line editing invention may add text to a WBD in a number of fashions:

a) the user 10 may place the text editing cursor within the text of the WBD and begin to type. This causes the user 10's text to be inserted as during use of a normal word processor.

b) the user 10 may select a portion of the WBD and begin to type. This causes the selected portion of the text to be displayed with a "strikeout" characteristic, and causes the new user text to be inserted immediately after the originally selected text in the WBD.

c) the user 10 may copy text from another application (such as a word processor or another web browser window) and paste that text into the edited WBD.

In response to a user text action, the in-line editing software inserts special in-line editing tags to represent the location and content of the user 10's text. In case (a), the editing software must simply add in-line editing tags immediately before and after the inserted text. No further work is required, because the inserted text portion of the WBD is guaranteed to not have mismatched or negating object tags, as described in the previous section.

For example if a WBD includes text A B C D before user action and a user 10 places the cursor between B and C and types in E, the resulting code after this action will be:

A B <in-line text start with single selection start and order 1>E </in-line text end with single selection end and order 1>C D For case (b) for text insertion, the in-line editing software places in-line editing strikeout tags before and after the selected text portion, followed by in-line editing text start/end tags before and after the inserted text. Finally, to ensure full undo capability, the in-line editing software places in-line editing tags before and after the entire affected area. The in-line editing software must also consider the mismatched tag cases, as described in the previous section, for the struck-out portion of the WBD.

If a WBD includes text A B C D before user action and a user 10 selects B in the browser and types in E, the resulting code after this action will be:

A <in-line tag with single selection start and order 1><in-line strikeout start>B </in-line strikeout end><in-line text start>E </in-line text end></in-line tag with single selection end and order 1>C D The final case (c) for in-line editing, where the user 10 pastes text copied from another application, is handled in the same fashion as cases (a) and (b). If the user 10 attempts to paste into the WBD while the text cursor is visible, case (a) is followed; if the user 10 attempts to paste into the WBD while a selection is visible, case (b) is followed.

Combining In-line Edits

As users 10 make multiple edits in a WBD, it may become necessary to "combine" and rearrange object tags that were initially inserted into the document by the in-line editing software. Such rearrangements ensure that the simplicity and validity of the underlying document object model is maintained, while maintaining the user 10's and the in-line editing software's distinct control over visual display and undo functionality in the WBD.

For example, suppose a user 10 of the in-line editing software selects a first portion of a WBD and changes the style of the text within that portion to boldface. If, later, the user 10 selects a second different portion of the WBD and changes the style to boldface and still later, the user 10 selects a third different portion of the WBD overlapping with the first portion, and also changes the style to boldface, the in-line editing software will combine the in-line editing tags from the two sections to simplify the browser's display task. First, the in-line editing software scans the newly selected portion of the WBD, looking for previously added in-line editing tags and, if such an in-line editing tag is found, the in-line editing software scans in reverse to find the matching start in-line editing tag. Immediately before the found start in-line editing tag, a special in-line editing "group" start tag is added to the WBD that alerts the in-line editing software to the fact that two separate sets of edits have been grouped together. The in-line editing "group" tag is given an order value one higher than that of the original in-line editing tag. A corresponding in-line editing "group" close tag is placed at the end of the new selection and in-line editing tags corresponding to the new editing action are then inserted. Using an algorithm analogous to the one for ensuring the proper nesting of tags in a WBD, the in-line editing software ensures that the most recent tags have the highest order value, and that only the start and end of the actual WBD selection are given the single selection flag attributes.

Undo of In-line Edits

As described above, the in-line editing software adds special in-line editing tags with custom order attributes to the document model of a WBD in response to user 10 editing actions. The order attributes are carefully managed to ensure the simplicity of the in-line editing undo feature.

Each edit action on the part of the user 10 causes the order value to increase by at least one; the order value increases by more than one only if previous edits must be grouped together by the in-line editing software. When a user 10 wishes to undo his most recent action, the in-line editing software simply locates the in-line editing tags with highest order value and removes them, along with all other in-line editing tags located directly between the highest order in-line editing tags. The in-line editing software then decreases the maximal order value by one, and searches for any in-line editing "group" tags with the maximal order. If found, these in-line editing "group" tags are removed, the order is again decremented, and the process of searching for in-line editing "group" tags of the highest order is repeated until either no in-line editing tags are found, or until the in-line editing tags of the highest order are not group tags.

Due to the careful way in which order values are maintained, the user 10 may continue to undo an indefinite number of actions in the WBD, in the reverse order with which they were originally done.

Saving and Restoring In-line Edits

The present invention includes the ability to save and restore edits generated by a user 10. When a user 10 makes edits on a WBD and then leaves the document, the in-line editing software automatically stores information (e.g., on a disk) regarding the nature of the edits that were made. When a user 10 later returns to the same WBD, the in-line editing software uses this stored information to locate portions of the WBD that were originally edited and to re-insert the necessary in-line tags in their proper locations.

One important feature of the restoration algorithm is that it is capable of restoring edits to a document that has been partially changed since it was first edited. Edits that were made to portions of the document that changed are lost. This is particularly useful for users 10 who need to edit relatively dynamic pages, such as the home pages of news sites. These sites tend to have pages that change in a very specific fashion: new stories are inserted at the top of the page, while old stories eventually "fall off" of the bottom. If a story marked at the top of a page falls to, say, the middle of the page, restoration of edits will still work successfully as the context information stored allows the in-line editing software to locate the proper positions of the in-line editing tags without regard to the location of the context within a WBD.

The in-line editing software saves edit information as follows. When the user 10 leaves the WBD, the in-line editing software scans through the entire WBD, noting the start and end locations of all in-line editing tags with single selection flags set, and all in-line editing "group" tags. After finding these in-line editing tags, the in-line editing software iterates through them, moving from lowest to highest order value.

For each pair of in-line editing tags found, the in-line editing software generates "context" information about the text of the WBD surrounding the tags. Typically the in-line editing software saves n words before and after the start tag, and n words before and after the matching end tag. (We have empirically determined that n=6 provides optimal restoration while conserving data storage space.) In-line editing software must explicitly work around standard tags (e.g., HTML tags specified by the World Wide Web Consortium's HTML 4.0 specification) located in the context areas of the WBD. In addition to the "context" information for each in-line editing tag, the in-line editing software generates information about the specific action performed by the user 10, including the type of edit, whether the edit forced in-line editing "group" tags to be constructed, whether it was necessary to add extra in-line editing tags to ensure the integrity of the WBD, and how far into the WBD the given in-line editing tags were located. Finally, the in-line editing software sorts the in-line editing tags based on the order in which they appear in the WBD (not based on their order values.) In-line editing tags that appear at the start of the page are saved first.

To restore the edits to a WBD based on the data saved, the in-line editing software begins by reading the data from the stored EDIT file into memory. The in-line editing software then scans from the start to the finish of the WBD. While scanning, the in-line editing software continually compares the text it reads from the WBD with the text of the first and second entries in the saved EDIT file. If the first entry's context text matches the WBD, the in-line editing software stores in memory information associating the given in-line editing operation with that particular location in the WBD. (Direct pointers into a WBD can be stored in memory but not on disk. This explains why the in-line editing software goes to great lengths to store context information about each in-line edit.) After a match is found, the first entry is removed from the list of context information and examined. At this point, the in-line editing software continues examining the second and third entries. If the first entry does not match, but the second entry does, the in-line editing software ignores the first entry as it is no longer part of the WBD and continues with the second and third entries. If both the first and second entries do not match, the in-line editing software proceeds to restore in-line editing tags by moving from the operation with the lowest order value to the operation with the highest order value. This ensures that in-line editing tags are properly nested and keep the WBD intact.

Previous embodiments described a method for maintaining object tags in a WBD while placing in-line editing tags 'outside' a portion of the WBD to be edited. That is, in-line editing tags are placed outside the beginning and ending of the portion of the WBD to be edited. In an alternative embodiment, in-line editing tags may be placed 'inside' the portion of the WBD to be edited as follows.

Once a user has selected a portion of the WBD for editing, the in-line editing software scans the selected portion for object tags that may potentially modify the appearance of the user's selected editing function. For example, an object tag which turns a bold function off would be flagged when a user has indicated a desire to bold the selected portion of the WBD. The in-line editing software then creates an array of pointers that point to locations in the code of the WBD immediately before and after each such object tag that may impact the appearance of the user's selected in-line editing function. In some cases, for example where every nested object tag may impact the selected in-line editing function, the array of pointers may be quite large. The in-line editing software then locates all of the portions of the selected portion of the WBD which lie between 2 such potentially impacting object tags but which contain no other tags therein and inserts, in each such portion, an "open" in-line editing tag for the selected editing feature immediately after the first of the 2 potentially impacting object tags and inserts a corresponding "close" in-line editing tag immediately before the second of the 2 potentially impacting object tags.

For example, assuming a user selects a portion of a WBD between B and C, this embodiment would insert the following codes:

| Original WBD | Edited WBD |
| --- | --- |
| ...A... | ...A... |
| ...B... | ...B... |
| ...C... | <in-line start tag> |
| ...D... | <in-line end tag> |
| | ...C... |
| | ...D... |
| or | |
| ...A... | ...A... |
| ...B... | ...B... |
| ... | <in-line start tag with single selection start> |
| </bold off> | ... |
| ... | <in-line end tag> |
| ...C... | </bold off> |
| ...D... | <in-line start tag> |
| | <in-line end tag with single selection end> |
| | ...C... |
| | ...D... |
| or | |
| ...A... | ...A... |
| ...B... | ...B... |

-continued

| Original WBD | Edited WBD |
|---|---|
| ... | <in-line start tag with single selection start> |
| </bold on> | ... |
| </italic off> | <in-line end tag> |
| </font size large off> | </bold on> |
| ... | </italic off> |
| </italic on> | </font size large on> |
| ...C... | <in-line start tag> |
| ...D... | ... |
|  | <in-line end tag> |
|  | </font size large off> |
|  | <in-line start tag> |
|  | ... |
|  | <in-line end tag> |
|  | </italic on> |
|  | <in-line start tag> |
|  | ... |
|  | <in-line end tag with single selection end> |
|  | ...C... |
|  | ...D... |

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A computer-implemented for editing Web-based documents, comprising the steps of:
   receiving from a user an indication of a selected portion of a Web-based document to be edited and an indication of a desired in-line editing function to be performed on the selected portion;
   responsive to the indication of the desired in-line editing function, inserting immediately prior to the selected portion a first in-line editing tag corresponding to the desired in-line editing function;
   detecting object tag elements within the selected portion;
   inserting immediately prior to each object tag element within the selected portion a second in-line editing tag corresponding to the desired in-line editing function and inserting the second in-line editing tag at the end of the selected portion;
   inserting immediately after each object tag element within the selected portion the first in-line editing tag, wherein the first and second in-line editing tags are distinguishable from the object tag elements irrespective of the in-line editing function to which the first and second in-line editing tags correspond;
   saving a portion of the Web-based document including the first and second in-line editing tags separate from the unedited Web-based document; and
   reinserting the first and second in-line editing tags into the unedited Web-based document where the first and second in-line editing tags were inserted prior to being saved in response to a reassembly request.

2. The method according to claim 1, wherein the first in-line editing tag opens the desired in-line editing function and the second in-line editing tag closes the desired in-line editing function.

3. The method according to claim 1 wherein, when an object tag element closing a first function is found within the selected portion of the Web-based document without a corresponding object tag element opening the first function, the method further comprises the steps of:
   inserting a third in-line editing tag closing the first function immediately prior to the first in-line editing tag immediately before the selected portion; and
   inserting a fourth in-line editing tag opening the first function immediately after the first in-line editing tag immediately before the selected portion.

4. The method according to claim 1, wherein, when an object tag element opening a first function is found within the selected portion of the Web-based document without a corresponding object tag element closing the first function, the method further comprises the steps of:
   inserting a third in-line editing tag opening the first function immediately after the second in-line editing tag immediately after the selected portion;
   inserting a fourth in-line editing tag closing the first function immediately before each object tag element within the selected portion after the object tag element opening the first function; and
   inserting a third in-line editing tag reopening the first function immediately after each object tag element within the selected portion after the object tag element opening the first function.

5. The method of claim 1, wherein receiving the indication of the desired in-line editing function includes receiving a user selection of the desired in-line editing function from an editing toolbar or a pull down menu.

6. The method of claim 1, wherein receiving the indication of the selected portion of the Web-based document to be edited includes receiving a user input highlighting the selected portion.

7. A computer-implemented method for editing Web-based documents, comprising the steps of:
   receiving from a user an indication of a selected portion of a Web-based document to be edited and an indication of a desired in-line editing function to be performed on the selected potion;
   responsive to the indication of the desired in-line editing function, inserting immediately prior to the selected portion a first in-line editing tag corresponding to the desired in-line editing function;
   detecting object tag elements within the selected portion;
   inserting immediately prior to each object tag element within the selected portion a second in-line editing tag corresponding to the desired in-line editing function and inserting the second in-line editing tag at the end of the selected portion;
   inserting immediately after each object tag element within the selected portion the first in-line editing tag, wherein the first and second in-line editing tags are distinguishable from the object tag elements irrespective of the in-line editing function to which the first and second in-line editing tags correspond;
   saving a portion of the Web-based document including the first and second in-line editing tags separate from the unedited Web-based document;
   detecting that the portion of the unedited Web-based document where the first and second in-line editing tags were inserted prior to the step of saving has been moved to a new location within the unedited Web-based document; and
   inserting the first and second in-line editing tags at the new location within the unedited Web-based document in the same relative position within the portion of the unedited Web-based document where the first and second in-line editing tags were inserted prior to being saved.

8. A computer-implemented method for editing Web-based documents, comprising the steps of:
   scanning a selected portion of a Web-based document for embedded tags;
   inserting into the selected portion of the Web-based document in-line editing tags based on the embedded tags and a desired in-line editing operation, wherein the in-line editing tags each have a custom attribute that identifies the respective in-line editing tag as being inserted based on the desired in-line editing operation to distinguish from the embedded tags;
   storing the in-line editing tags and context portions of the Web-based document associated with the in-line editing tags separate from the unedited Web-based document; and
   reinserting the in-line editing tags into the unedited Web-based document based on the context portions.

9. A computer readable medium having computer-executable instructions stored thereon for performing steps of the method recited in claim 8.

10. The method of claim 8, wherein the context portions of the Web-based document include portions of the Web-based document immediately prior to and after where the in-line editing tags were inserted into the Web-based document.

11. The method of claim 8, wherein the step of storing includes storing the in-line editing tags and context portions of the Web-based document associated with the in-line editing tags in a file including data identifying a view; the method further comprising the step of redefining the in-line editing tags to include the view prior to the step of reinserting the in-line editing tags.

12. The method of claim 11, wherein the view includes color.

13. The method of claim 8, wherein the step of storing includes storing the in-line editing tags and context portions of the Web-based document associated with the in-line editing tags in a plurality of files, at least one of the files including data identifying a view; the method further comprising the steps of:
   receiving a user selection identifying a file including data identifying a view; and
   redefining the in-line editing tags to include the view prior to the step of reinserting the in-line editing tags.

14. The method according to claim 8, wherein the step of reinserting includes searching the Web-based document for the context portions and inserting the in-line editing tags within corresponding context portions of the Web-based document.

15. The method of claim 14, wherein the context portions of the Web-based document have changed location prior to the step of reinserting.

16. The method of claim 14, wherein the context portions include n words before and after each in-line editing tag.

17. The method according to claim 8, further including scanning the selected portion of the Web-based document for previously added in-line edit tags, wherein if the previously added in-line edit tag corresponds to the desired in-line editing operation then inserting a group in-line editing tag next to the previously added in-line edit tag.

18. The method according to claim 8, further comprising:
   assigning the in-line editing tags a first custom order attribute;
   repeating the steps of scanning and inserting for a second set of in-line editing tags; and
   assigning the second set of editing tags a second custom order attribute higher than the first custom order attribute.

19. The method of claim 18 further comprising the step of removing the second set of in-line editing tags from the Web-based document responsive to receiving an undo command.

20. A software package for editing Web-based documents stored on one or more computer readable media, comprising:
   an interface module for interfacing with browser software;
   a receiving module for receiving from a user an indication of a selected portion of a Web-based document currently displayed by the browser software, and an indication of a desired in-line editing function to be performed on the selected portion;
   an object tag detecting object tag elements within the selected portion;
   an insertion module inserting immediately prior to and after each object tag element within the selected portion of the Web-based document in-line editing tags corresponding to the desired in-line editing function, the insertion module inserting in-line editing tags immediately prior to the selected portion and immediately after the selected portion, wherein the in-line editing tags are distinguishable from the object tag elements irrespective of the in-line editing function to which the first and second in-line editing tags correspond; and
   a saving module saving a portion of the Web-based document including the in-line editing tags, wherein the insertion module reinserts the tags into the Web-based document in response to a reassembly request.

21. The software package according to claim 20, wherein the portion of the Web-based document including the in-line editing tags includes contextual data, the contextual data aiding in identifying where the in-line editing tags were inserted prior to being saved.

22. A software package for editing Web-based documents stored on one or more computer readable media, comprising:
   an interface module for interfacing with browser software;
   a receiving module for receiving from a user an indication of a selected portion of a Web-based document currently displayed by the browser software, and an indication of a desired in-line editing function to be performed on the selected portion;
   an object tag detecting module detecting object tag elements within the selected portion;
   an insertion module inserting immediately prior to and after each object tag element within the selected portion of the Web-based document in-line editing tags corresponding to the desired in-line editing function, the insertion module inserting in-line editing tags immediately prior to the selected portion and immediately after the selected portion, wherein the in-line editing tags are distinguishable from the object tag elements irrespective of the in-line editing function to which the first and second in-line editing tags correspond;
   a saving module saving a portion of the Web-based document including the in-line editing tags; and
   a detecting module detecting the portion of the Web-based document where the in-line editing tags were located prior to saving has been moved to a new location within the Web-based document, wherein the insertion module reinserts the in-line editing tags at the new location within the Web-based document in the same relative position within the portion of the Web-based document where the in-line editing tags were inserted prior to being saved.

23. The software package according to claim 22, wherein a first in-line editing tag opens the desired in-line editing function and a second in-line editing tag closes the desired in-line editing function so that the insertion module inserts a first in-line editing tag immediately prior to each object tag encountered within the selected portion and inserts a second in-line editing tag immediately after each object tag encountered within the selected portion.

24. The software package according to claim 22, wherein, when an object tag element closing a first function is found within the selected portion of the Web-based document without a corresponding object tag element opening the first function, the insertion module inserts an in-line editing tag closing the first function immediately prior to the in-line editing tag immediately before the selected portion and inserts an in-line editing tag opening the first function immediately after the in-line editing tag immediately before the selected portion.

25. The software package according to claim 22, wherein, when an object tag element opening a first function is found within the selected portion of the Web-based document without a corresponding object tag element closing the first function, the insertion module inserts an in-line editing tag opening the first function immediately after the in-line editing tag immediately after the selected portion, and inserts an in-line editing tag closing the first function immediately before each object tag element within the selected portion after the object tag element opening the first function and inserts an in-line editing tag reopening the first function immediately after each object tag element within the selected portion after the object tag element opening the first function.

26. The software package according to claim 22, wherein the portion of the Web-based document including the in-line editing tags includes contextual data, the contextual data aiding in identifying where the in-line editing tags were inserted prior to being saved.

* * * * *